United States Patent
Katayama et al.

(10) Patent No.: US 6,792,350 B2
(45) Date of Patent: Sep. 14, 2004

(54) NAVIGATION SYSTEM FOR MOVING BODY

(75) Inventors: Mutsumi Katayama, Saitama (JP); Hiroyuki Morita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/131,024

(22) Filed: Apr. 25, 2002

(65) Prior Publication Data

US 2002/0169542 A1 Nov. 14, 2002

(30) Foreign Application Priority Data

May 11, 2001 (JP) ......................................... 2001-141554

(51) Int. Cl.⁷ .............................................. G01C 21/30
(52) U.S. Cl. ..................... 701/209; 701/201; 701/211; 340/995.19; 340/995.23
(58) Field of Search ................................ 701/209, 201, 701/202, 208, 210, 211; 340/995.19, 995.23, 995.24, 995.27, 995.28

(56) References Cited

U.S. PATENT DOCUMENTS

| | | | | |
|---|---|---|---|---|
| 5,689,423 A | * | 11/1997 | Sawada | ...................... 701/202 |
| 6,047,235 A | * | 4/2000 | Hiyokawa et al. | ........... 701/201 |
| 6,115,655 A | * | 9/2000 | Keith et al. | ..................... 701/35 |
| 6,256,579 B1 | * | 7/2001 | Tanimoto | ..................... 701/201 |
| 6,263,276 B1 | * | 7/2001 | Yokoyama et al. | .......... 701/207 |
| 6,327,533 B1 | * | 12/2001 | Chou | .......................... 701/207 |
| 6,385,535 B2 | * | 5/2002 | Ohishi et al. | ................ 701/209 |
| 6,453,235 B1 | * | 9/2002 | Endo et al. | .................. 701/211 |
| 6,456,932 B2 | * | 9/2002 | Yagyu | ......................... 701/209 |
| 6,581,001 B1 | * | 6/2003 | Katsuka et al. | .............. 701/209 |

FOREIGN PATENT DOCUMENTS

| | | |
|---|---|---|
| JP | 7-55481 | 3/1995 |
| JP | 7-91971 | 4/1995 |
| JP | 2000-314634 | 11/2000 |

* cited by examiner

Primary Examiner—Tan Q. Nguyen
(74) Attorney, Agent, or Firm—Birch, Stewart, Kolasch & Birch, LLP

(57) ABSTRACT

To provide a navigation system for a moving body useful to carry out delivery service operation. A delivery history is included in customer information, and a route guide including at least one past delivery destination point is generated. A method of navigating a movable body for a delivery service is also included.

20 Claims, 11 Drawing Sheets

FIG. 1

12: DIRECTION SENSOR
13: VEHICLE SPEED SENSOR
14: MAP INFORMATION SUPPLYING APPARATUS
15: CUSTOMER INFORMATION STORING APPARATUS
16: INPUT APPARATUS
23: INTERFACE CIRCUIT GROUP
24: INTERFACE CIRCUIT
25: INTERFACE CIRCUIT
26: INTERFACE CIRCUIT
29: DISPLAY CONTROL CIRCUIT
30: GRAPHIC CONTROLLER
32: DISPLAY APPARATUS

DELIVERY PREPARATION MODE SETTING ROUTINE

S11: RETRIEVE CUSTOMER INFORMATION

S12: IS THERE CORRESPONDING CUSTOMER INFORMATION?

S13: DISPLAY DELIVERY CUSTOMER INFORMATION

S14: RECEIVE ADDITIONAL CUSTOMER INFORMATION

S15: INPUT ORDER INFORMATION

S16: SET "ORDER RECEIVED" FLAG

S17: RETRIEVE CONTAINER COLLECTING POINT

S18: IS THERE CONTAINER COLLECTING POINT?

S19: DISPLAY "ROUTE SEARCH MENU"

S20: DISPLAY "NO CONTAINER COLLECTING POINT FOUND"

S21: GENERATE OUTWARD ROUTE GUIDE

S22: GENERATE BACKWARD ROUTE GUIDE

RETURN

DELIVERY MODE SETTING ROUTINE

S61: IS "DELIVERING" FLAG OF DELIVERY CUSTOMER INFORMATION SET?

S62: ROUTE GUIDE DISPLAY PROCESSING

S63: HAS MOVING BODY ARRIVED AT EITHER STARTING POINT, WAY POINT, OR DESTINATION POINT?

S64: HAS MOVING BODY ARRIVED AT STARTING POINT?

S65: IS DELIVERY SERVICE COMPLETED?

S66: STORE DELIVERY AND COLLECTION HISTORY OF EACH CUSTOMER

S67: HAS MOVING BODY ARRIVED AT DESTINATION POINT?

S68: DISPLAY DELIVERY CUSTOMER INFORMATION

S69: IS DELIVERY COMPLETED?

S70: DISPLAY COLLECTION CUSTOMER INFORMATION

S71: IS COLLECTION COMPLETED?

RETURN

FIG. 8

A: OUTWARD ROUTE GUIDE
B: DELIVERY POINT
C: COLLECTING POINT
D: CURRENT POSITION OF MOVING BODY
E: COLLECTING POINT
F: BACKWARD ROUTE GUIDE
G: SHOP
H: SCHOOL

FIG. 9

12: DIRECTION SENSOR
13: VEHICLE SPEED SENSOR
16: INPUT APPARATUS
23: INTERFACE CIRCUIT GROUP
26: INTERFACE CIRCUIT
29: DISPLAY CONTROL CIRCUIT
30: GRAPHIC CONTROLLER
32: DISPLAY APPARATUS
50: COMPUTER
52: COMMUNICATION INTERFACE CIRCUIT

NAVIGATION SYSTEM FOR MOVING BODY

CROSS-REFERENCE TO RELATED APPLICATIONS

This non-provisional application claims priority under 35 U.S.C. § 119(a) on U.S. patent application Ser. No. 2001-141554 filed in Japan on May 11, 2001, the entirety of which is hereby incorporated by reference.

BACKGROUND OF THE INVENTION

1. Field of the Invention

The present invention relates to a navigation system for a moving body that displays map information, and particularly to a navigation system for a moving body that displays a route guide.

2. Description of Background Art

With a conventional navigation system, when generating a route guide to a destination point and having a place to stop at on the way to the destination point, an operator himself/herself inputs the place, sets the place to stop at as a way point, retrieves a route from a starting point to the destination point via the way point, and displays the route as a route guide.

It is conceivable, however, that the navigation system is mounted on a moving body such as a motorcycle used for a delivery service provided by a delivery service shop such as a sushi shop, a soba shop, or other food shops, for example. In the case of delivery service, it is convenient to the shop to stop at a house to which delivery has been made previously and collect empty containers on the way from the shop to a delivery point and back to the shop. In such a case, when generating a route guide by the navigation system, it is difficult to input way points to generate the route guide unless the operator remembers delivery points where containers have not been collected.

In such a case, since it is difficult to remember the delivery points where containers have not been collected yet, taking notes of the delivery points or the like is conceivable, but is troublesome because the operator is required to select the delivery points where containers have not been collected from notes or the like and input way points individually to generate the route guide.

Furthermore, the operator may stop by to collect a container after delivery at any time, since passage of sufficient time is required for the customer to finish eating the delivered food.

SUMMARY OF THE INVENTION

It is accordingly an object of the present invention to provide a navigation system for a moving body, which is useful to carry out a delivery service operation.

According to the present invention, there is provided a navigation system for a moving body, comprising: initial setting means for setting a starting point and a destination point of a moving body in response to an operation starting instruction; map information storing means for storing map information; display map information generating means for generating display map information from the map information storing means; route guide generating means for generating a route guide connecting the starting point and the destination point to each other; display means for superimposing the route guide on the display map information for display; and destination point history storing means for storing the destination point in a destination point history database; wherein the route guide generating means includes in the route guide at least one of such destination points other than the present destination point from the destination point history database.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention will hereinafter be described with reference to the accompanying drawings.

Figure 1:
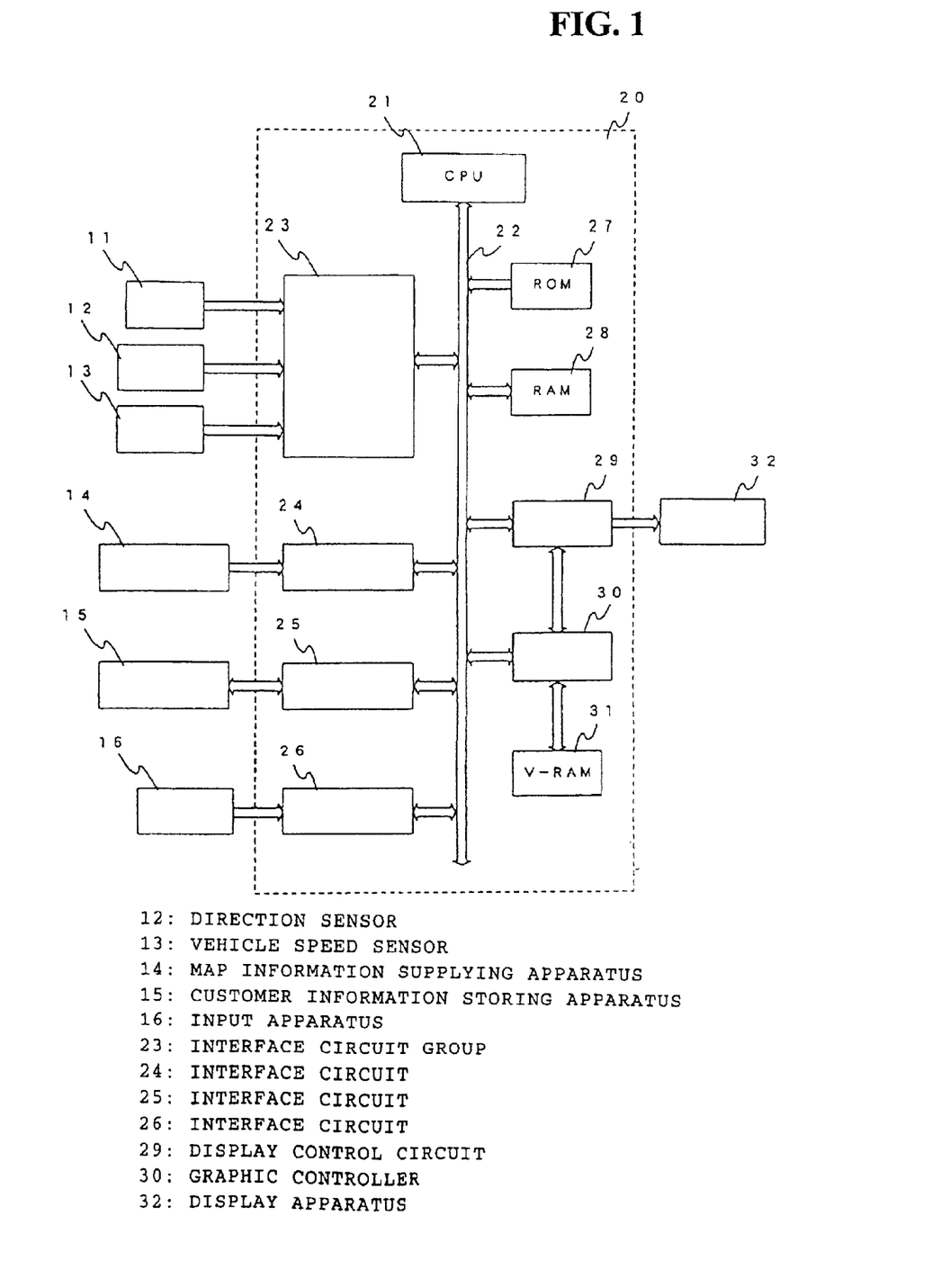
FIG. 1 is a block diagram of a navigation system for a moving body according to the present invention.

FIG. 1 is a block diagram of a navigation system for a moving body according to the present invention.

A GPS (global positioning system) apparatus 11 generates current position information of a moving body as an output from latitude and longitude information. A direction sensor 12 such as a geomagnetic sensor or a gyro sensor is used to autonomously detect the direction of the moving body. A vehicle speed sensor 13 sends a signal representing a vehicle traveling speed based on the number of vehicle speed pulses generated in proportion to an angle of rotation of a drive shaft of the vehicle, for example. Output signals generated by the sensors 11 to 13 are supplied to an interface circuit group 23. Incidentally, the GPS apparatus 11 is connected with a GPS antenna (not shown) for receiving a radio wave emitted from a satellite.

A map information supplying apparatus 14 is formed by a CD-ROM drive or a DVD drive for reading map information written on a nonvolatile recording medium, for example a CD-ROM or a DVD. The map information stored on the CD-ROM or the DVD is supplied to an interface circuit 24.

The interface circuit group 23 and the interface circuit 24 are connected to an input/output bus 22 of a control apparatus 20. The input/output bus 22 is formed so that a data signal or an address signal is inputted to or outputted from a central processing circuit (hereinafter referred to as a CPU) 21. The output information from the sensors 11 to 13 described above and the map information from the map information supplying apparatus 14 are read in response to an instruction from the CPU 21 issued in predetermined timing, and then supplied to the input/output bus 22.

A customer information storing apparatus 15 is formed by a storage device such as a hard disk drive. The customer information storing apparatus 15 supplies information read from the hard disk to an interface circuit 25, and writes information supplied from the interface circuit 25 onto the hard disk. Such operations are performed in response to an instruction from the CPU 21.

An input apparatus 16 is connected to an interface circuit 26. The interface circuit 26 is connected to the input/output bus 22. Various instructions issued from the input apparatus 16 in response to input operation of an operator are supplied to the CPU 21 via the interface circuit 26. The input apparatus 16 is formed by a keyboard including various keys (not shown) such as a decision key for deciding on an item displayed on a display apparatus 32 to be described later. The input apparatus 16 may also include a pointing device such as a mouse for specifying a position on a map displayed on the display apparatus 32.

The CPU 21 executes subroutines to be described later in response to a mode selecting instruction via the input apparatus 16.

The input/output bus 22 is connected with a ROM (Read Only Memory) 27 and a RAM (Random Access Memory) 28. The ROM 27 stores a program for displaying map information on the display apparatus 32 to be described later, and a program for retrieving a container collecting point. On the other hand, the RAM 28 stores map information of a specified area displayed on the display apparatus 32, and a value of a variable used in an executed program. The RAM 28 is formed by a memory in which stored information is not erased even when power supply is cut off, such as a nonvolatile memory. In addition, the input/output bus 22 is connected with a display control circuit 29 and a graphic controller 30. The display control circuit 29 is connected with the display apparatus 32. The graphic controller 30 is connected with a V-RAM 31 for storing displayable video information. The graphic controller 30 writes data to the V-RAM 31 and reads data from the V-RAM 31 in response to an instruction from the CPU 21. The display control circuit 29 controls the display apparatus 32 according to video information outputted from the graphic controller 30.

Figure 2:
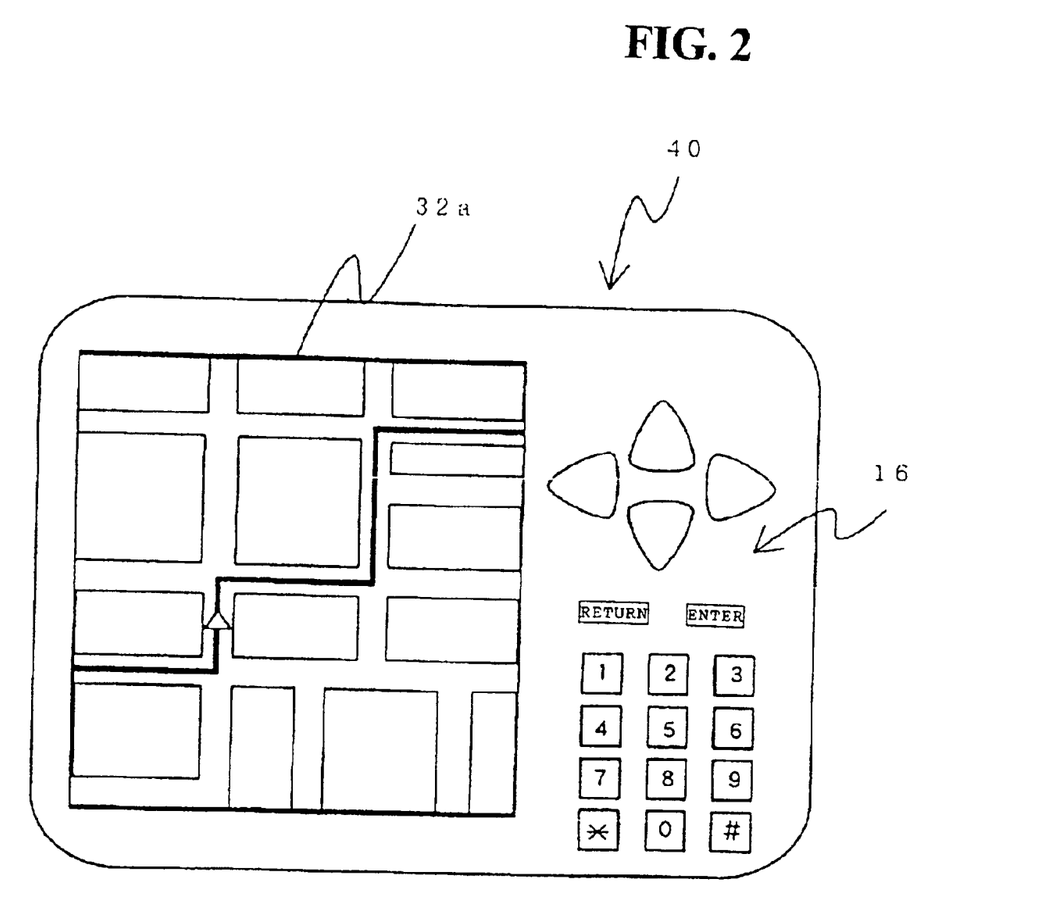
FIG. 2 is a general view of a module including an input apparatus and a display apparatus.

FIG. 2 shows a concrete example of a module 40 including the input apparatus 16 and the display apparatus 32 of the navigation system for a moving body shown in FIG. 1.

A screen 32a of the display apparatus 32 displays map information, a current position of a moving body indicated by a triangle, and a route guide indicated by a thick solid line. The input apparatus 16 is formed by various input keys such as a selection key for selecting processing from a displayed menu and a decision key for deciding whether the selected processing is to be carried out.

In a case where the moving body is a motorcycle, for example, the module 40 is mounted at a central portion of handlebars of the motorcycle so as to be visible to an occupant of the motorcycle, that is, an operator. The other parts of the navigation system for a moving body shown in FIG. 1 can be built into the module 40, or can be disposed at an appropriate position of the motorcycle as a separate unit.

A module as conventionally known as a module specially designed for vehicle navigation and a PDA (Personal Digital Assistant) apparatus can be used as the module 40.

Figure 3:
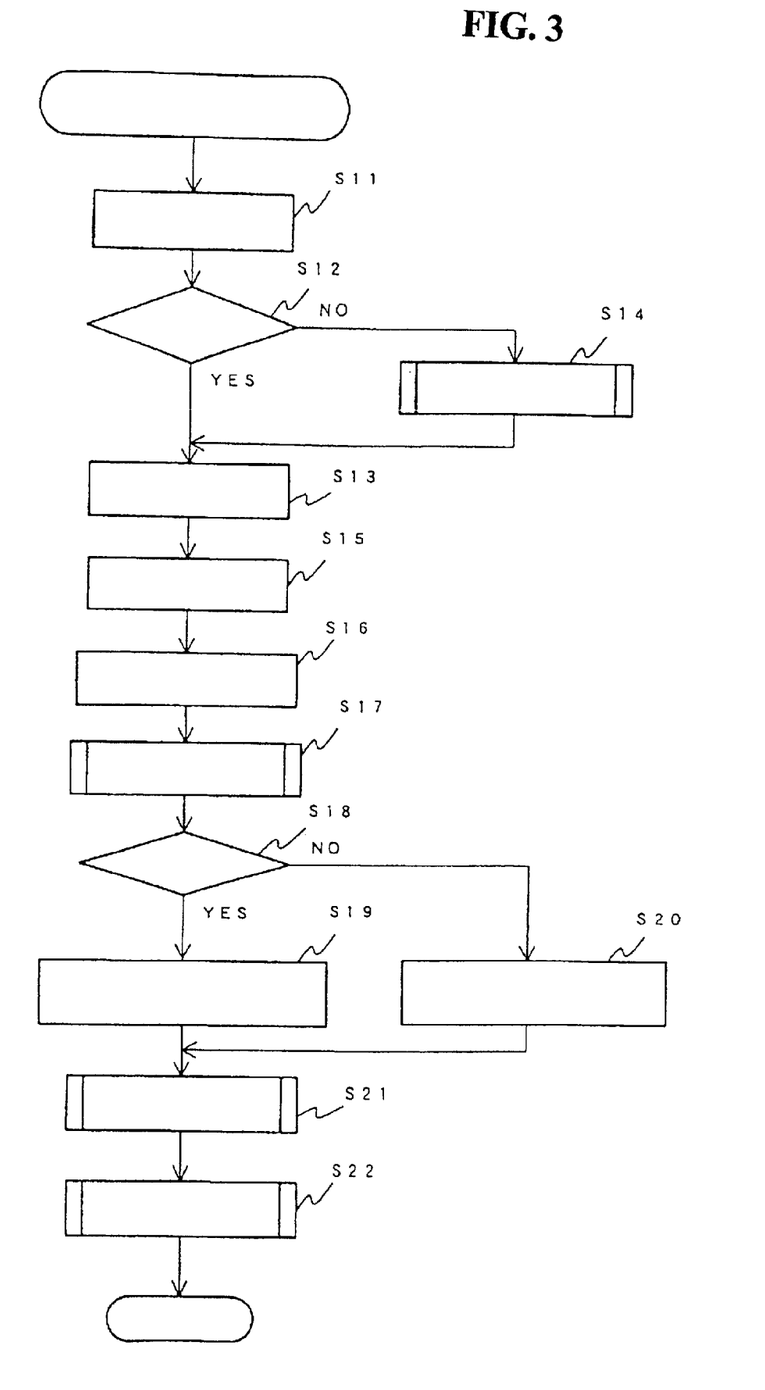
FIG. 3 is a flowchart of a subroutine of a delivery preparation mode.

A subroutine of a delivery preparation mode of the navigation system for a moving body will next be described with reference to FIG. 3. Incidentally, subroutines shown in FIGS. 3 to 7 are executed by interrupting a main routine of the CPU 21.

First, customer information is retrieved (step 11). For example, on the basis of an input such as a "name" and "address" by the operator via the input apparatus 16, the customer information of the customer is retrieved from the customer information storing apparatus 15 storing customer information.

A name, an address, a telephone number, and a latitude and a longitude coordinate corresponding to the address of the customer are stored in this customer information. The customer information is provided with an area for storing information on an order from the customer (hereinafter referred to as order information), such as a name of the order, quantity, price, and time of receiving the order. The customer information is also provided with an area for storing delivery completion time to be described later. In addition, the customer information is provided with an "order received" flag, a "delivering" flag, a "delivery completed" flag, and a "collection completed" flag for determining a state of delivery. All the flags are initially set at 0. When an order is received, the "order received" flag is set to 1, which indicates at a glance that an order is received. When delivery is started, the "delivering" flag is set to 1, which indicates at a glance that delivery is being made. When delivery is completed, the "delivery completed" flag is set to 1, which indicates at a glance that delivery is completed. When collection is completed, the "collection completed" flag is set to 1, which indicates at a glance that the collection of a container is completed. When there is an inquiry from an customer about a state of delivery or the like, such flags relating to the state of delivery make it possible for a clerk at the delivery service shop to look at the customer information and answer the inquiry. Incidentally, the customer information may include not only information such as a name, an address, a telephone number, order information, and delivery service history of a customer, but also information such as age and family structure of the customer.

Next, whether there is corresponding customer information is determined (step 12). When the corresponding customer information is detected, the processing proceeds to step 13. When the corresponding customer information is not detected, the processing proceeds to a step 14 to effect additional customer information receiving mode to be described later and thereby store new customer information in the customer information storing apparatus 15. It is to be noted that the customer information detected at the step 11 or the customer information newly added at the step 14 is customer information of a delivery point, which is a destination of the present delivery (hereinafter referred to as delivery customer information). Also, the coordinates of an address included in the delivery customer information are the coordinates of the delivery point, or the destination (hereinafter referred to as delivery point coordinates). Next, the delivery customer information is read from the customer information storing apparatus 15 to be displayed on the display apparatus 32 (step 13). Each piece of information relating to order information provided for the delivery customer information is then stored by input of the operator (step 15). Furthermore, the "order received" flag of the delivery customer information is set to 1, and the delivery customer information is stored in the RAM 28 (step 16). This may be carried out by input of the operator, for example.

A container collecting point retrieving routine to be described later is then called and executed (step 17). When it is determined at a step 18 that collection customer information to be described later is detected, step 19 is carried out. When it is determined at the step 18 that no collection customer information is detected, step 20 is carried out. When the collection customer information is detected, an indication of "container collecting point found" and also choices such as "collect before delivery," "collect after delivery," and "cancel" are displayed as a route search menu on a display unit of the display apparatus, for example (step 19). The processing then proceeds to step 21. When many container collecting points are detected and the containers cannot be collected at a specific time, for example, such choices displayed so as to be selectable by the operator make it possible to collect the containers the next time. In addition, when there is no time to collect containers during busy hours around noon, for example, it is possible to make delivery only. When no collection customer information is detected, it is determined that no relevant information is found, whereby an indication of "no container collecting point found," for example, is displayed on the display unit of the display apparatus, and then the processing proceeds to step 21 (step 20).

Thereafter, a subroutine for generating an outward route guide from the shop to the delivery point, which subroutine will be described later, is executed (step 21). A subroutine for generating a backward route guide from the delivery point to the shop is then executed (step 22). The present subroutine is thereby ended.

A subroutine for receiving additional customer information as described above will be described with reference to FIG. 4.

Figure 4:
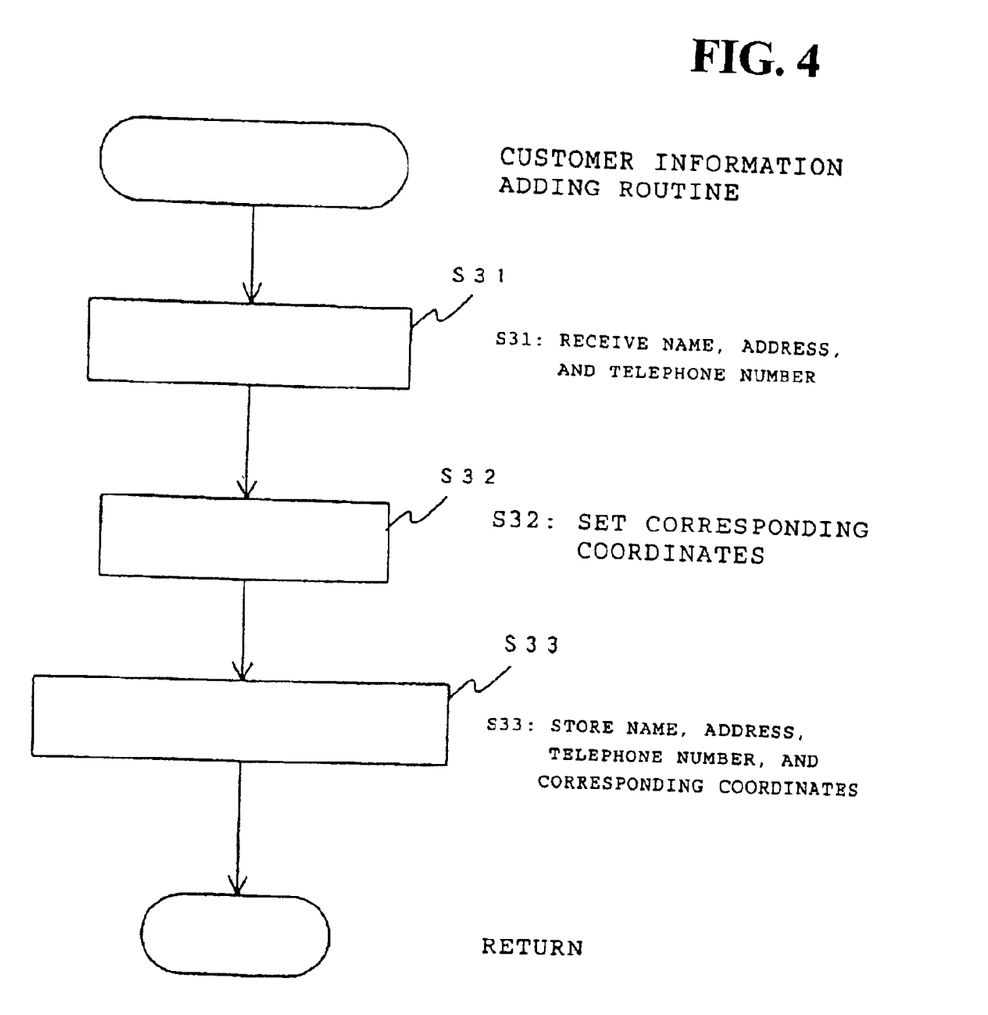
FIG. 4 is a flowchart of a subroutine for receiving additional customer information.

First, a name, an address, and a telephone number are received (step 31). This is carried out by input of the operator. A latitude and a longitude coordinate corresponding to the address of the customer are then set (step 32). The setting may be made for example by the operator operating a selection key or a mouse and thereby moving the pointer to specify the point, or may be retrieved from a database created in advance using the address or the telephone number. The name, address, telephone number, and corresponding coordinates obtained at the steps 31 and 32 are then stored in the customer information storing apparatus 15 (step 33). The present subroutine is thereby ended.

The subroutine for retrieving a container collecting point as mentioned above will be described with reference to FIG. 5.

Figure 5:
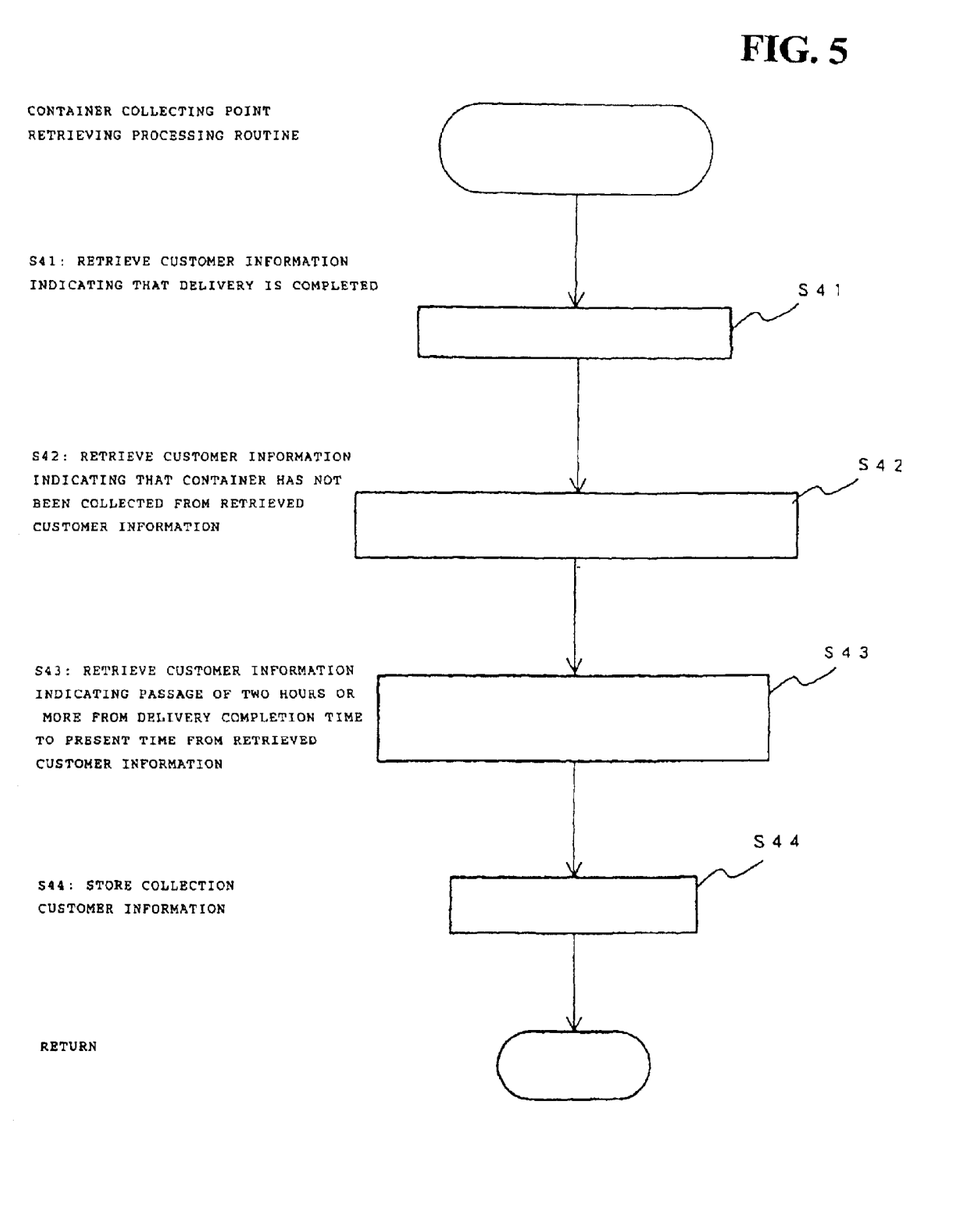
FIG. 5 is a flowchart of a subroutine for retrieving a container collecting point.

First, customer information indicating that delivery is completed is retrieved from the customer information stored in the customer information storing apparatus 15 (step 41). This is to select customer information whose "delivery completed" flag is set at 1. Next, customer information indicating that the container has not yet been collected is retrieved from the selected customer information (step 42). This is to select customer information whose "collection completed" flag is set at 0. Then, customer information indicating passage of a predetermined time period, for example two hours from the delivery completion time to the present time is further selected from the selected customer information (step 43). A value stored in advance as a fixed time period may be used as the predetermined time period at all times, or a value set by the operator may be used as the predetermined time period. Thus, the customer information indicating passage of the predetermined time period from the delivery completion time to the present time is retrieved because collection of the container after the completion of the delivery requires passage of a sufficient time for the customer to finish eating the order. It is to be noted that the customer information selected at the step 43 is customer information of the container collecting point, which is a way point of the present delivery (hereinafter referred to as collection customer information). Also, the coordinates of an address included in the collection customer information are the coordinates of the container collecting point, or the way point (hereinafter referred to as collecting point coordinates). The collection customer information retrieved at the step 43 is stored in the RAM 28 (step 44). The present subroutine is thereby ended.

The subroutine for generating an outward route guide from the shop to the delivery point as mentioned above will be described with reference to FIG. 6.

Figure 6:
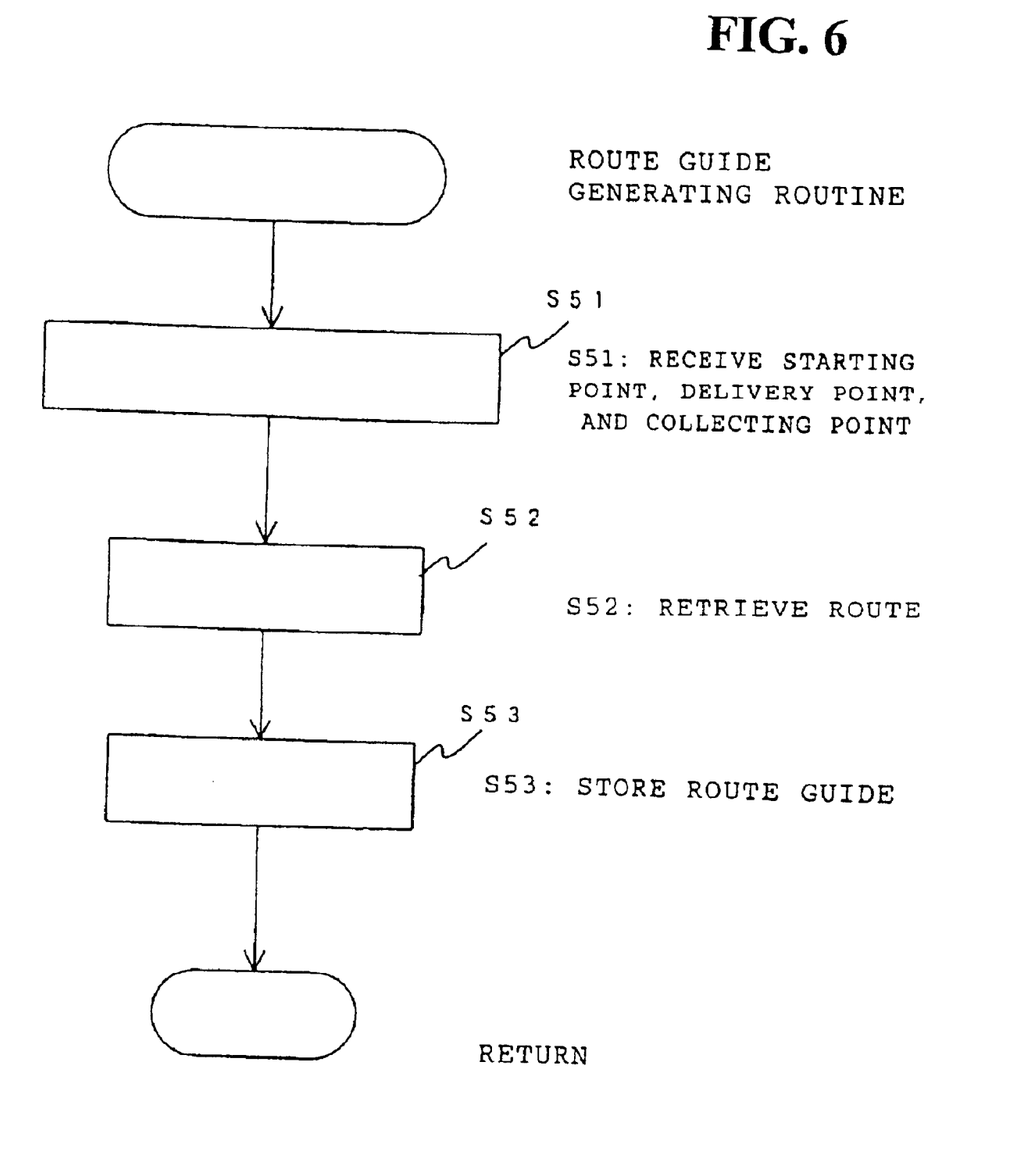
FIG. 6 is a flowchart of a subroutine for generating a route guide.

First, a starting point, a collecting point, and a delivery point are received (step 51). In the case of the starting point, it is known that the starting point is the shop, and therefore the latitude and longitude coordinates corresponding to the address of the shop (hereinafter referred to as starting point coordinates) stored in advance may be read, for example.

The collecting point coordinates included in the collection customer information stored at the step 44 in FIG. 5 are used as the collecting point. Thus, the collecting point coordinates of the collection customer information selected from the prestored customer information are used as the collecting point, or the way point, which eliminates the need for the operator himself/herself to input the collecting point. It is to be noted that when the operator chooses "collect after delivery" displayed on the display apparatus at the step 19 in FIG. 3, the collecting point is not set in generating the outward route guide. The delivery point coordinates included in the delivery customer information at the step 13 in FIG. 3 are used as the delivery point.

A route by which the moving body is to move is then retrieved using the starting point coordinates, the delivery point coordinates, and map information to thereby generate a route guide (step 52). Incidentally, a known method, for example a method as disclosed in Japanese Patent Laid-Open No. Hei 7-55481 or Japanese Patent Laid-Open No. Hei 7-91971 can be used to retrieve the route. When there are a plurality of selectable routes, the plurality of routes may be displayed on the map, and a pointer may be displayed on the display apparatus 32 so that the route guide is selected by the input apparatus. In addition, when an angle formed between a straight line connecting the shop with the delivery point and a straight line connecting the shop with the collecting point is a certain angle or more, a route that does not include the collecting point may be retrieved. Since the certain angle varies depending on the size of an area where delivery is possible, the certain angle can be set by the shop to an arbitrary value. The generated route guide is then stored in the RAM 28 (step 53). The present subroutine is thereby ended. A backward route guide from the delivery point to the shop is generated in the same manner. When the operator chose "collect after delivery" displayed on the display apparatus at the step 19 in FIG. 3, the collecting point is set in generating the backward route guide.

When the map information supplying apparatus 14 and the control apparatus 20 shown in FIG. 1 are connected to each other via a designated connector for the interface circuit, for example, detailed map information of an area around the collecting point and around the delivery point may be generated in conjunction with the map information displayed in generating the route guide. The detailed map information of the area around the collecting point and around the delivery point may then be stored in the RAM 28 in conjunction with the route guide at the step 53. This makes it possible to display the map information on the display apparatus, and also to display the detailed map information of the area around the collecting point and around the delivery point even when the map information supplying apparatus 14 and the control apparatus 20 are disconnected from each other. A known method, for example a method as disclosed in Japanese Patent Laid-Open No. 2000-314634 can be used to generate the more detailed map information of the area around the collecting point and around the delivery point.

When the navigation system for a moving body includes the map information supplying apparatus 14 connected to the control apparatus 20 via a designated connector for the interface circuit as in the above example, strip-shaped map information may be generated along the route guide. The strip-shaped map information may be stored in the RAM 28 in conjunction with the route guide at the step 53. This makes it possible not only to display the map information on the display apparatus even when the map information supplying apparatus 14 and the control apparatus 20 are disconnected from each other, but also to reduce the capacity of the RAM 28 because the amount of map information stored in the RAM 28 can be reduced as compared with the amount of map information stored when strip-shaped map information along the route guide is not generated. A known method, for example a method as disclosed in Japanese Patent Laid-Open No. 2000-314634 can be used to generate the strip-shaped map information along the route guide.

Figure 7:
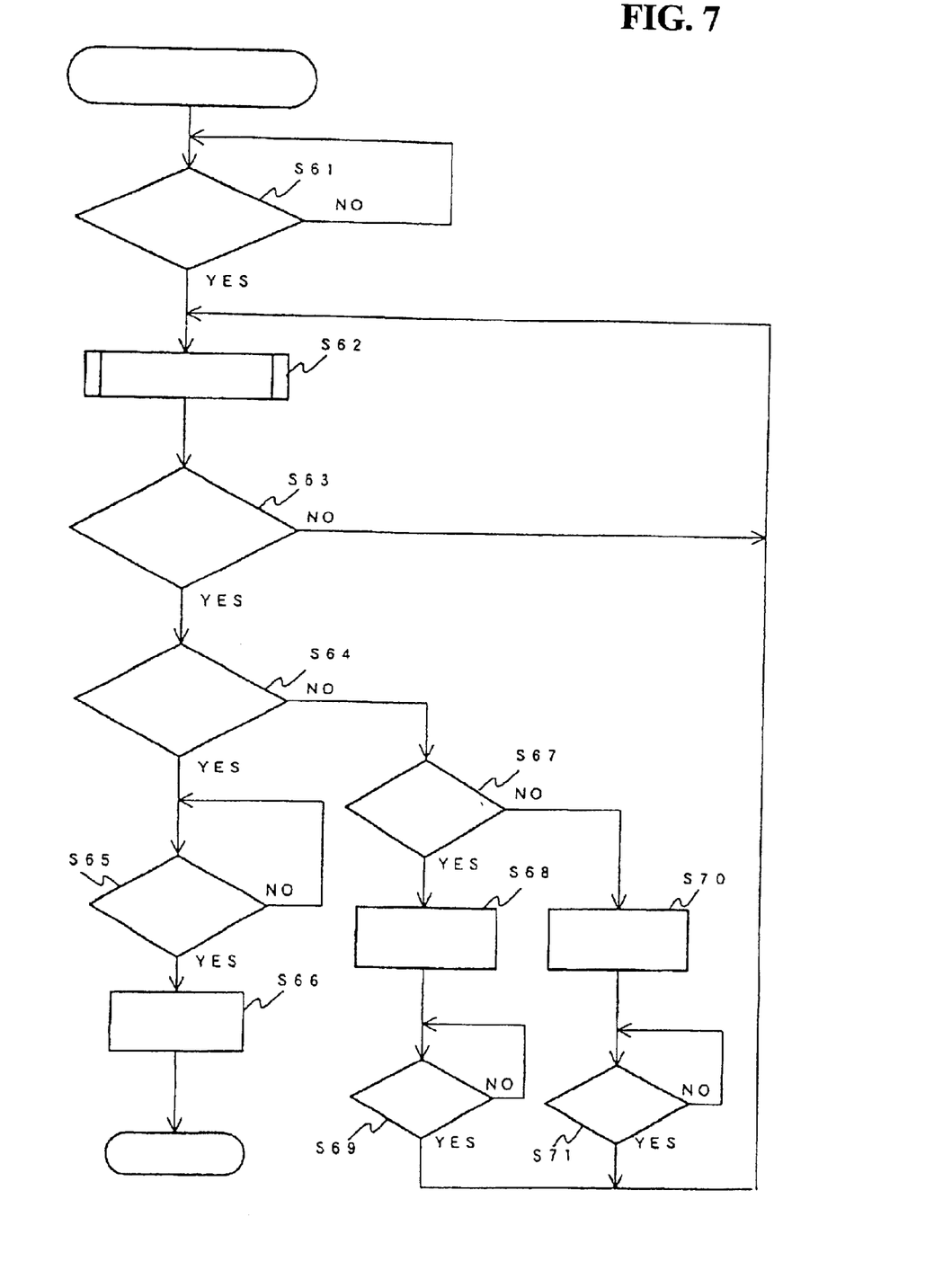
FIG. 7 is a flowchart of a subroutine of a delivery mode.

A delivery subroutine executed when the operator selects delivery mode on a menu screen after completing the preparation for delivery will be described with reference to FIG. 7.

Figure 8:
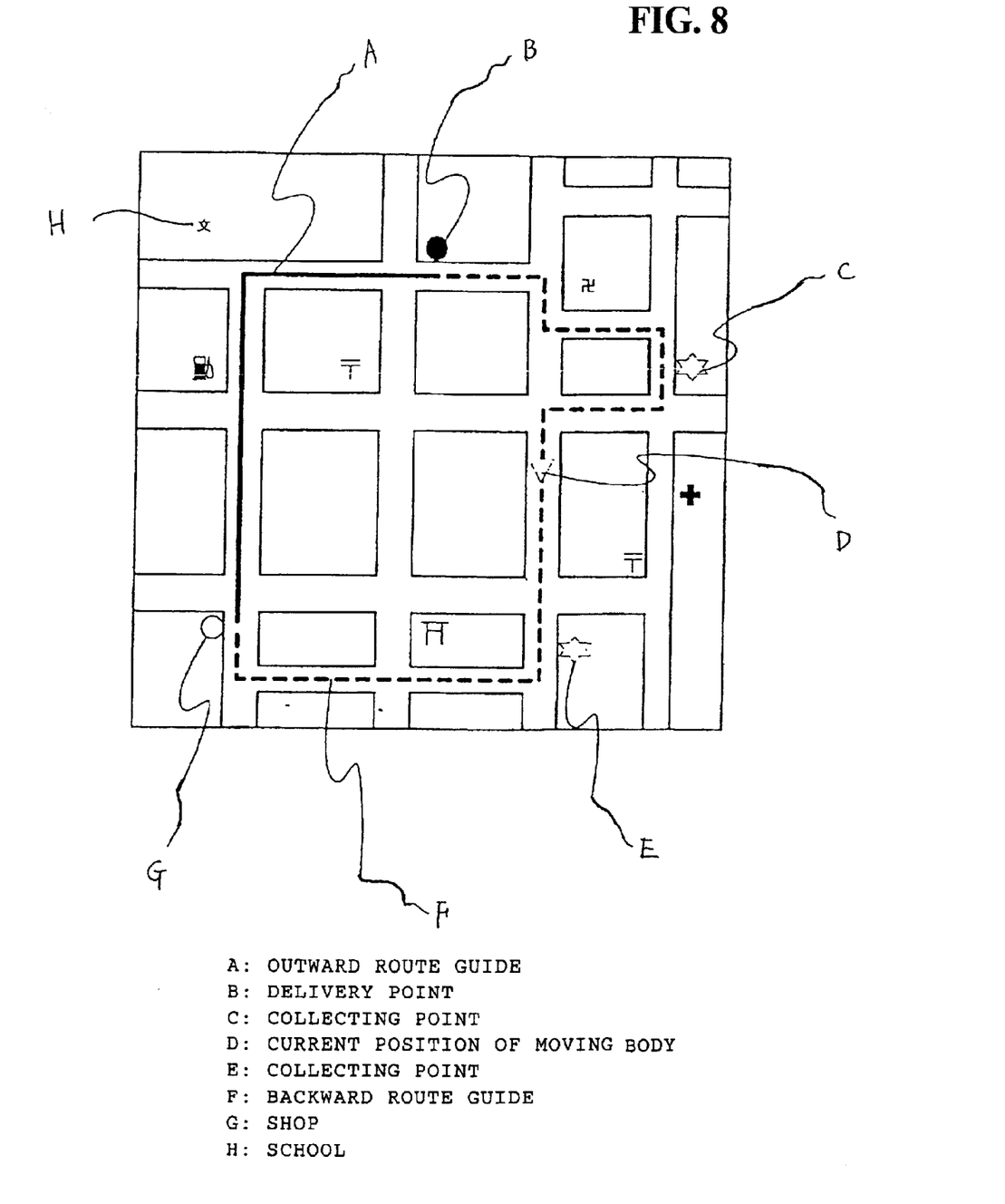
FIG. 8 is a diagram showing an example of a display screen displaying details of a route guide and the current position of a moving body on a map.

First, whether the "delivering" flag of the delivery customer information is set at 1 is determined (step 61). The "delivering" flag is set to 1 by input of the operator via the input apparatus 16, for example. Next, display processing for a screen to be displayed on the display apparatus 32 is performed (step 62). The display processing detects the current position of the moving body from the above-described GPS 11, the traveling direction of the moving body from the direction sensor 12, and the speed of the moving body from the speed sensor 13, for example. Map information of a given area corresponding to the current position of the moving body is displayed on the display apparatus 32. A route guide corresponding to the map as well as the current position, the traveling direction and the like of the moving body is displayed on the displayed map. In a display example shown in FIG. 8, a route guide is generated on an assumption that container collection is to be made after delivery. The display apparatus displays the map information, the current position D of the moving body denoted by a triangle, a shop G denoted by an open circle, a delivery point B denoted by a closed circle, and two collecting points C, E denoted by hexagrams. The display apparatus also displays the outward route guide A denoted by a thick solid line and the backward route guide F denoted by a broken line. A school H is also identified by an appropriate symbol, as well as gas stations, hospitals, etc. Referring to the screen displayed by the display processing, the operator makes actual movement while driving the moving body.

Whether the moving body has arrived at either the starting point, the destination point, or the way point is then determined (step 63). This determination is made on the basis of whether the coordinates of the current position of the moving body and the preset coordinates of the shop, the delivery point, or the collecting point coincide with each other, or whether a distance between the current position of the moving body and the shop, the delivery point, or the collecting point is within a predetermined range, for example. When it is determined at the step 63 that the moving body has arrived at either the starting point, the destination point, or the way point, whether the moving body has arrived at the starting point is then determined (step 64). This determination is made by the preset starting point coordinates, for example. When it is determined that the moving body has arrived at the starting point, that is, the shop, whether the delivery service is completed is then determined (step 65). This determination is made on the basis of the "delivery completed" flag and the "collection completed" flag at steps 69 and 71, respectively, to be described later and an operation input by the operator indicating the completion of the delivery service, for example. This determination serves to confirm that the delivery service provided to the customers has been completed, and the operator and the moving body have returned to the shop. When it is determined that the delivery service is completed, the history and state of each customer relating to delivery and collection are stored in the customer information storing apparatus 15 (step 66), whereby the present subroutine is ended.

When it is determined at the step 64 that the moving body has not arrived at the starting point, whether the moving body has arrived at the destination point is determined (step 67). This determination is made by the set delivery point coordinates, for example. When it is determined that the moving body has arrived at the destination point, that is, the delivery point, the delivery customer information is displayed on the display apparatus 32 (step 68). The operator can complete delivery correctly by looking at this information and confirming the name and price of the order and the like. Whether the delivery is completed is then determined (step 69). This determination is made on the basis of whether the "delivery completed" flag is set at 1. The flag is set to 1 by an input operation of the operator, for example. The time when the delivery is completed is recorded as delivery completion time in the area for delivery completion time provided for the delivery customer information described above. Storing the delivery completion time makes it possible to determine passage of time from the delivery completion time to the present time. When it is determined that the delivery is not completed, the processing returns to the step 68 to continue displaying the delivery customer information until it is determined that the delivery is completed. When it is determined that the delivery is completed, on the other hand, the processing then returns to the step 62 to repeat the processing steps described above, and the operator makes movement by operating the moving body referring to the displayed screen.

When it is determined at the step 67 that the moving body has not arrived at the destination point, the collection customer information corresponding to the way point, that is, the collecting point is displayed on the display apparatus 32 (step 70). The operator can complete container collection correctly by looking at this information and confirming the number of containers to be collected and the like. Next, whether the collection is completed is determined (step 71). This determination is made on the basis of whether the "collection completed" flag is set at 1. The flag is set to 1 by an input operation of the operator after the operator collects the containers from a person at the collecting point, for example. When the "collection completed" flag is set at 0 and it is thus determined that the collection is not completed, the processing returns to the step 70 to continue displaying the collection customer information until the flag is set to 1 and it is thereby determined that the collection is completed. When it is determined that the collection is completed, on the other hand, the processing then returns to the step 62 to repeat the processing steps described above, and the operator makes movement while driving the moving body referring to the displayed screen.

Figure 9:
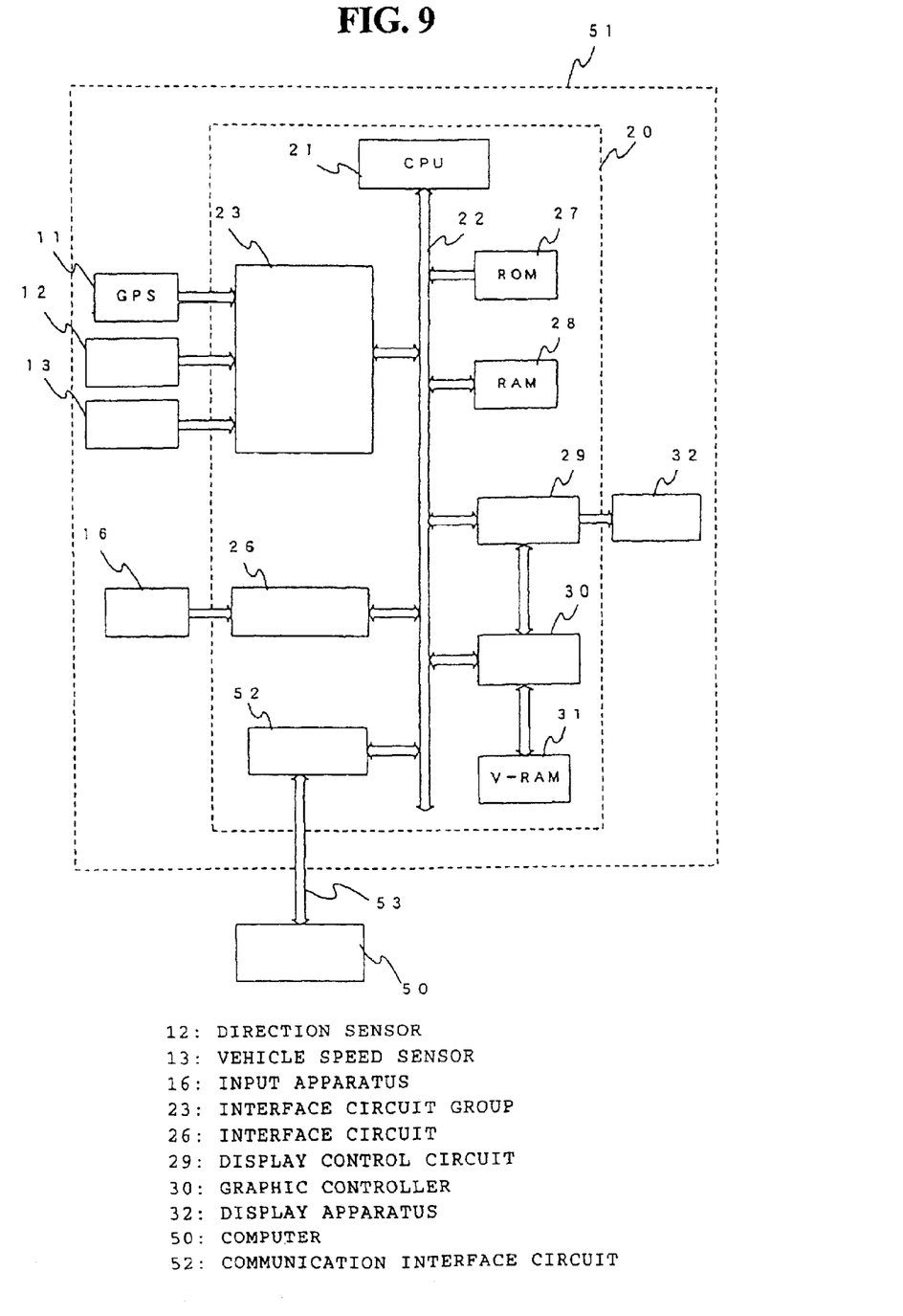
FIG. 9 is a block diagram of another embodiment according to the present invention.

FIG. 9 shows another embodiment. In FIG. 9, the same parts as in FIG. 1 are identified by the same reference numerals.

A navigation system for a moving body shown in FIG. 9 has a computer 50, for example, as the map information supplying apparatus 14 and the customer information storing apparatus 15 as shown in FIG. 1. A navigation apparatus 51 is formed by the control apparatus 20, the input apparatus 16, and the display apparatus 32 shown in FIG. 1. The navigation apparatus 51 further includes a communication interface circuit 52 for communication with a server via a communication line, for example a LAN or a telephone line to be connected to the computer 50. The navigation apparatus 51 may be configured such that an auxiliary storage device, for example an IC card formed by a nonvolatile memory, for storing information of a high storage volume that cannot be stored in a RAM 28, and its interface circuit are connected to an input/output bus 22. Furthermore, in displaying the current position of a vehicle, the navigation apparatus 51 is connected with sensors 11 to 13. In this embodiment, the navigation apparatus 51 is not provided with a map information supplying apparatus 14. Therefore, in order to display map information on the display apparatus 32, map information displayed in generating the route guide in FIG. 6 is stored in the RAM 28 of the navigation apparatus 51 or the above-mentioned auxiliary storage device. Such a configuration enables miniaturization of the navigation apparatus 51.

In the present embodiment, the delivery preparation setting processing is performed by the computer 50. The delivery preparation setting processing is performed by operating a keyboard or a mouse of the computer 50 and executing a subroutine as shown in FIG. 3 in the computer 50. Map information, delivery customer information, collection customer information, and route guides obtained by the processing are stored in a storage device such as a memory or a hard disk of the computer 50. Processing for storing the map information, the delivery customer information, the collection customer information, and the route guides in the RAM 28 of the navigation apparatus 51 or the above-mentioned auxiliary storage device is performed in a state in which the computer 50 is connected to the navigation apparatus 51 by a communication line 53. A predetermined instruction is issued to the computer 50 via the communication line 53 by the operator operating the input apparatus 16 provided to the navigation apparatus 51. According to the instruction, the computer 50 is operated remotely to supply the map information, the delivery customer information, the collection customer information, and the route guides to the navigation apparatus 51. The navigation apparatus 51 stores in the RAM 28 or the auxiliary storage device the map information, the delivery customer information, the collection customer information, and the route guides supplied thereto. The processing for storing the map information, the delivery customer information, the collection customer information, and the route guides in the RAM 28 of the navigation apparatus 51 or the above-mentioned auxiliary storage device may also be performed by the operator operating the keyboard or the mouse of the computer 50 to supply the map information, the delivery customer information, the collection customer information, and the route guides to the navigation apparatus 51 via the communication line 53.

When the navigation apparatus 51 is mounted on the vehicle to move, the connection between the navigation apparatus 51 and the computer 50 via the communication line 53 is broken, and the GPS and other sensors 11 to 13 are connected to the navigation apparatus 51 having the map information, the delivery customer information, the collection customer information, and the route guides recorded therein. It is thereby possible to display the current position of the vehicle, the map information, the route guides, the delivery customer information, and the collection customer information on the navigation apparatus 51 while the vehicle is moving.

A wired connection by a connecting cable and a wireless connection by infrared radiation (IrDA), bluetooth, a portable phone, a PHS (Personal Handy Phone) or the like may be used for the communication line 53. In the case of the connection using a portable phone or the like, even when the moving body is on the route, the processing of the "delivery completed" flag and the "collection completed" flag can be reflected immediately on the computer 50 at the shop, and the current position of the moving body can be determined at the shop as required.

The embodiment as shown in FIG. 9 enables a delivery service shop requiring a plurality of navigation apparatus to generate map information, delivery customer information, collection customer information, and route guides necessary for each of the navigation apparatus by using a single computer.

The above description has dealt with embodiments of the navigation system for a moving body according to the present invention for delivery service provided by a sushi shop, a soba shop and the like. However, for delivery by a pizza shop or the like, which does not collect containers, "container collection" can be changed to "distribution of coupons." At the step 43 in FIG. 5, customer information indicating passage of two weeks or more since last delivery, for example, is retrieved to generate a route guide including an address of the retrieved customer information. Then a coupon is distributed to the way point during delivery or after delivery to invite use of the delivery service for next time.

In addition, the navigation system for a moving body according to the present invention may be in a form used as a portable system also for movement on foot when the current position of the moving body can be detected. It is to be noted that the delivery service in the present invention is not limited to food shops, and may be considered to be a concept including service of a laundry of receiving an order and delivering cleaned laundry or order-taking service.

As described above, the navigation system for a moving body according to the present invention selects an appropriate way point and displays a route guide including the way point when a destination point for delivery service is set. Therefore, the navigation system for a moving body according to the present invention is convenient for carrying out delivery service operation by moving body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A navigation system for a moving body, comprising:
   initial setting means for setting a starting point and a destination point of a moving body in response to an operation starting instruction;
   map information storing means for storing map information;
   display map information generating means for generating display map information from said map information storing means;
   route guide generating means for generating a route guide connecting said starting point and said destination point to each other;
   display means for superimposing said route guide on said display map information for display; and
   destination point history storing means for storing said destination point in a destination point history data base,
   wherein said route guide generating means includes in said route guide at least one destination point from said destination point history database other than said destination point, said at least one other destination point being retrieved from said destination point history databse without being set by said initial setting means.

2. The navigation system for a moving body as claimed in claim 1, wherein said route guide generating means includes said at least one other destination point in one of an outward route from said starting point to said destination point and a backward route from said destination point to said starting point in said route guide.

3. The navigation system for a moving body as claimed in claim 2, wherein said route guide generating means selects one of said outward route and said backward route according to an input instruction.

4. The navigation system for a moving body as claimed in claim 3, wherein said destination point history database further includes related information corresponding to said at least one other destination point and said destination point, and said route guide generating means includes in said route guide at least one of said at least one other destination point selected on the basis of said related information.

5. The navigation system fora moving body as claimed in claim 4, wherein said related information is the time when the moving body arrived at a destination point, and said route guide generating means includes in said route guide at least one of said at least one destination point selected on the basis of time elapsed from said time to present time.

6. The navigation system for a moving body as claimed in claim 2, wherein said destination point history database further includes related information corresponding to said at least one other destination point and said destination point, and said route guide generating means includes in said route guide at least one of said at least one other destination point selected on the basis of said related information.

7. The navigation system for a moving body as claimed in claim 6, wherein said related information is the time when the moving body arrived at a destination point, and said route guide generating means includes in said route guide at least one of said at least one destination point selected on the basis of time elapsed from said time to present time.

8. The navigation system for a moving body as claimed in claim 1, wherein said destination point history database further includes related information corresponding to said at least one other destination point and said destination point, and said route guide generating means includes in said route guide at least one of said at least one other destination point selected on the basis of said related information.

9. The navigation system for a moving body as claimed in claim 8, wherein said related information is the time when the moving body arrived at a destination point, and said route guide generating means includes in said route guide at least one of said at least one destination point selected on the basis of time elapsed from said time to present time.

10. The navigation system as claimed in claim 1, wherein said at least one other destination point is retrieved by said route guide generating means on the basis of predetermined information regarding said at least one other destination point.

11. A method of navigating a moving body, comprising the steps of:
    setting a starting point and a destination point of a moving body in response to an operation starting instruction;
    storing map information;
    generating display map information;
    generating a route guide connecting said starting point and said destination point to each other;
    superimposing said route guide on said display map information for display; and
    storing said destination point in a destination point history database,
    wherein said route guide includes at least one destination point from said destination point history database other than said destination point, said at least one other destination point being retrieved from said destination point history databse without being set in said step of setting.

12. The method of navigating a moving body as claimed in claim 11, wherein said step of generating a route guide further includes the step of generating said at least one other destination point in one of an outward route from said starting point to said destination point and a backward route from said destination point to said starting point in said route guide.

13. The method of navigating a moving body as claimed in claim 12, further comprising the step of selecting one of said outward route and said backward route according to an input instruction.

14. The method of navigating a moving body as claimed in claim 13, wherein said step of storing further includes the step of storing related information corresponding to said at least one other destination point and said destination point in said destination point history database, said method further comprising the step of selecting at least one of said at least one other destination point on the basis of said related information.

15. The method of navigating a moving body as claimed in claim 14, wherein said related information is the time when the moving body arrived at a destination point, said method further comprising the step of selecting at least one of said at least one destination point on the basis of time elapsed from said time to present time.

16. The method of navigating a moving body as claimed in claim 12, wherein said step of storing further includes the step of storing related information corresponding to said at least one other destination point and said destination point in said destination point history database, said method further comprising the step of selecting at least one of said at least one other destination point on the basis of said related information.

17. The method of navigating a moving body as claimed in claim 16, wherein said related information is the time when the moving body arrived at a destination point, said method further comprising the step of selecting at least one of said at least one destination point on the basis of time elapsed from said time to present time.

18. The method of navigating a moving body as claimed in claim 11, wherein said step of storing further includes the step of storing related information corresponding to said at least one other destination point and said destination point in said destination point history database, said method further comprising the step of selecting at least one of said at least one other destination point on the basis of said related information.

19. The method of navigating a moving body as claimed in claim 18, wherein said related information is the time when the moving body arrived at a destination point, said method further comprising the step of selecting at least one of said at least one destination point on the basis of time elapsed from said time to present time.

20. The method of navigating a moving body as claimed in claim 11, wherein said step of generating a route guide includes the step of retrieving said at least one other destination point on the basis of predetermined information regarding said at least one other destination point.

* * * * *